United States Patent [19]

Michelsen

[11] 3,973,448

[45] Aug. 10, 1976

[54] ELECTRIC HOISTS

[76] Inventor: Edwin R. Michelsen, Rte. 1, Box 33, Clinton, Minn. 56225

[22] Filed: May 9, 1973

[21] Appl. No.: 358,635

[52] U.S. Cl. .......... 74/421 R; 74/413; 74/665 B

[51] Int. Cl.$^{2}$ .......... F16H 1/20; F16H 1/06; F16H 37/06

[58] Field of Search .......... 74/665 B, 421 A, 413, 74/665 E; 269/58, 61; 254/47, 194; 214/130; 212/21; 259/171

[56] References Cited

UNITED STATES PATENTS

| | | | |
|---|---|---|---|
| 1,495,930 | 5/1924 | Sing | 74/665 B X |
| 3,207,002 | 9/1965 | Lakin et al. | 74/665 B |
| 3,330,164 | 7/1967 | Wilson | 74/665 B X |
| 3,373,626 | 3/1968 | Maurer et al. | 74/665 B X |

*Primary Examiner*—Leonard H. Gerin

[57] ABSTRACT

This invention relates in general to certain new and useful improvements in electric hoists. Presently produced hoists do not use electric drills for power and are relatively large, heavy and costly.

2 Claims, 10 Drawing Figures

ELECTRIC HOISTS

It is therefor the primary purpose of this invention to provide a hoist which is powered by one or more quick attachable and quick detachable, reversing electric drills. Such drills are in wide use and are seldom, if ever, used continuously for their intended primary function of drilling and, hence, are available for motive power on a hoist if such a hoist was procureable. Furthermore, since electric drills are mass produced with built in speed reducing gears, their cost when considered in the total cost of an electric hoist, which is a rather low production volume item, would be greatly reduced when compared to production of hoists with built in motor and complete gear train.

It is also an object of the present invention to provide an electric hoist with quick detachable motors which can be replaced with hand cranks where electric current is not available.

It is a further object of this invention to provide an electric hoist with a ring gear in the final drive which utilizes more then one drive pinion in such a manner as to distribute strain over a larger area and over more gear teeth thereby permitting the use of smaller, lighter and less costly final gear drives.

It is another object of the present invention to provide an electric hoist which can initially be purchased at a very low cost to utilize an electric drill already owned or with one or two electric drills and the option of later adding more electric drills when future needs may demand more power.

With the above and other objects in view my invention resides in the novel features of form, construction arrangement and combination of parts presently described and pointed out in the five claims.

In the drawings —

Figure 1:
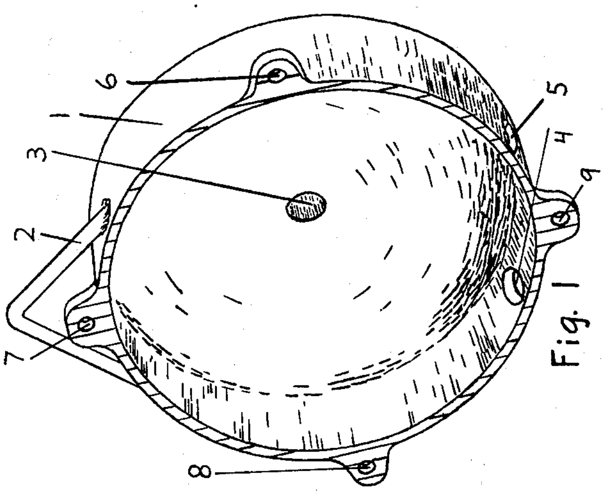
FIG. 1 is a perspective view of the main hoist body.
Figure 6:
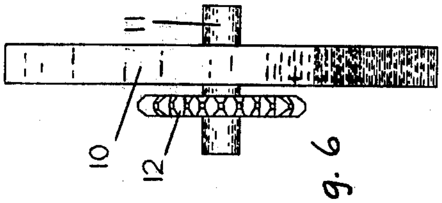
FIG. 6 is an elevational, perspective view depicting the same assembly as FIG. 2.
Figure 2:
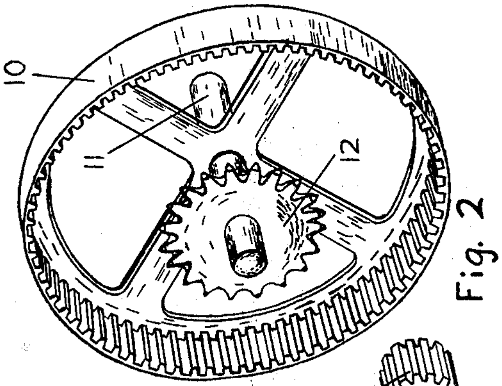
FIG. 2 is a perspective view of the final drive ring gear, its shaft and roller chain drive sprocket.
Figure 5:
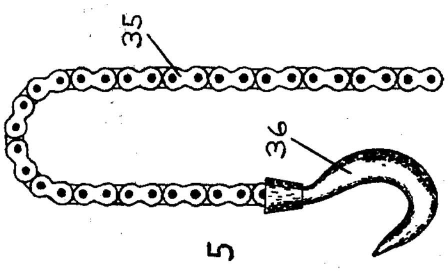
FIG. 5 is a side elevational view of the lift chain, which is a roller chain, and the lift hook.
Figure 3:
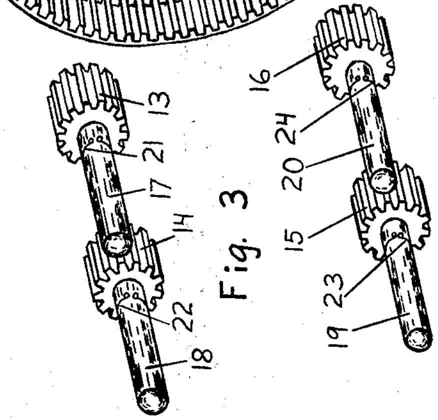
FIG. 3 is a perspective view of the pinions for the final drive along with their integrally attached shafts to which electric drills are chucked.
Figure 4:
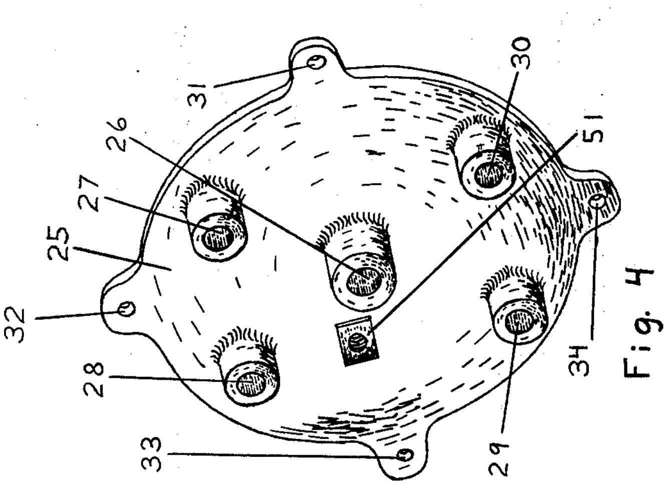
FIG. 4 is a perspective view of the cover plate for the main hoist body which also includes the bearings for the drive pinions.
Figure 7:
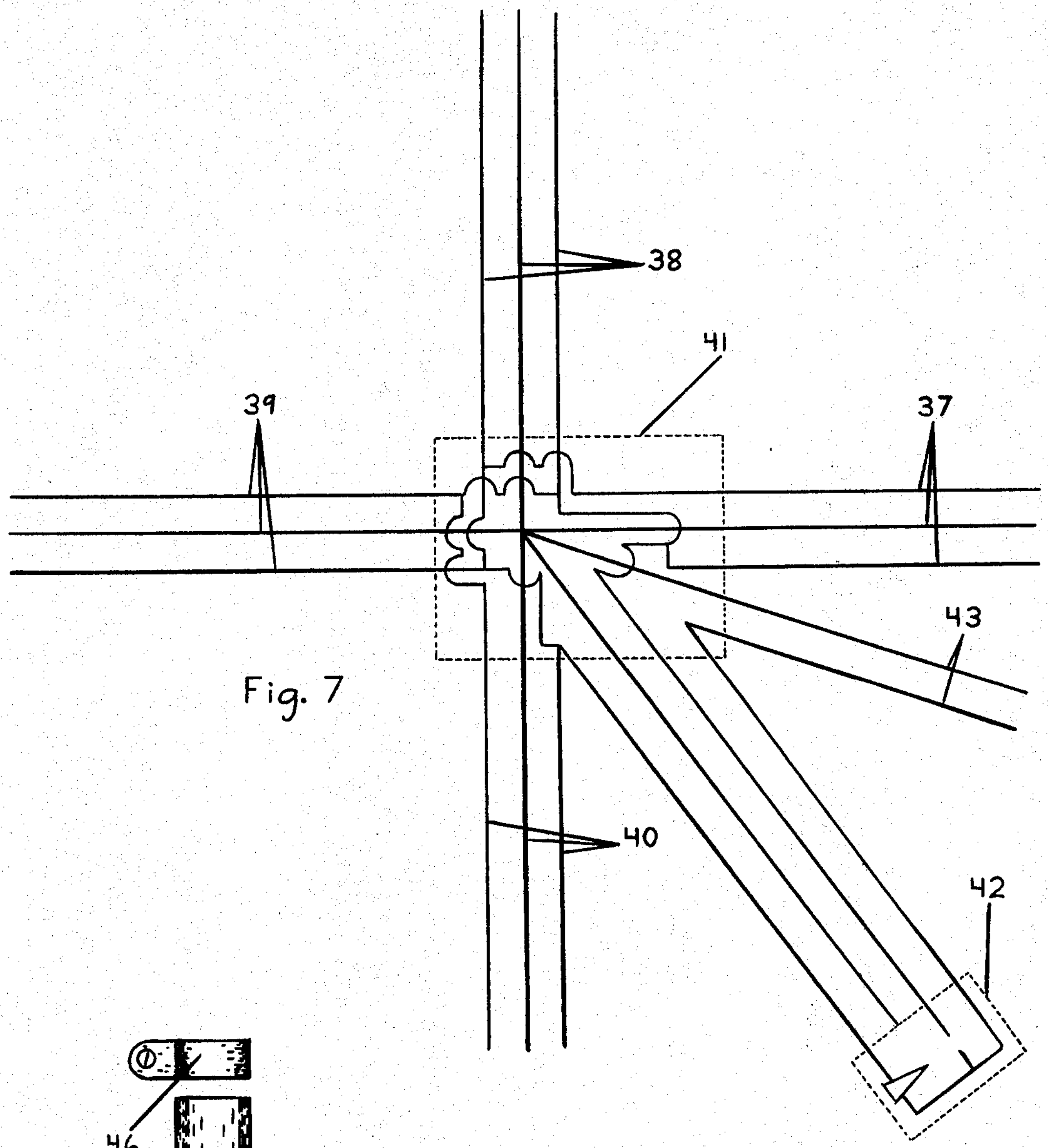
FIG. 7 is an electrical schematic diagram showing the electrical relationship between the various electric drills, junction box, switch and line power cable.
Figure 8:
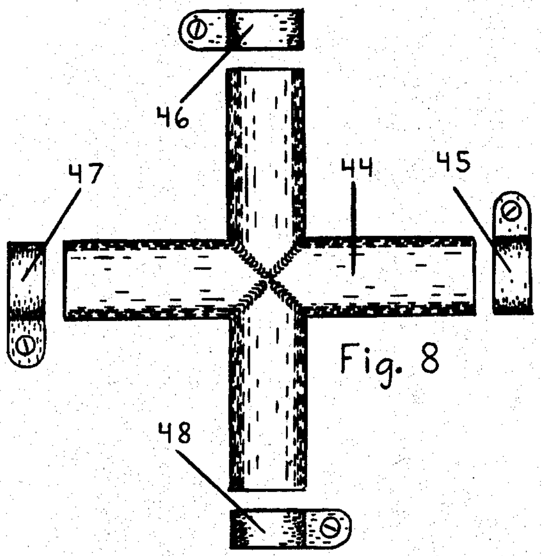
FIG. 8 is an elevational view of the tubular cross with attendent hose clamps which serve to stabilize the electric drills, preclude drill body rotation and to practically join all the electric drills into one power assembly.
Figure 9:
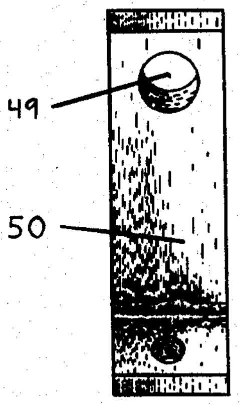
FIG. 9 is a perspective view of the bracket bolted to the hoist cover plate which accepts the electric drill pipe handle to preclude drill body rotation when only one drill is used.
Figure 10:
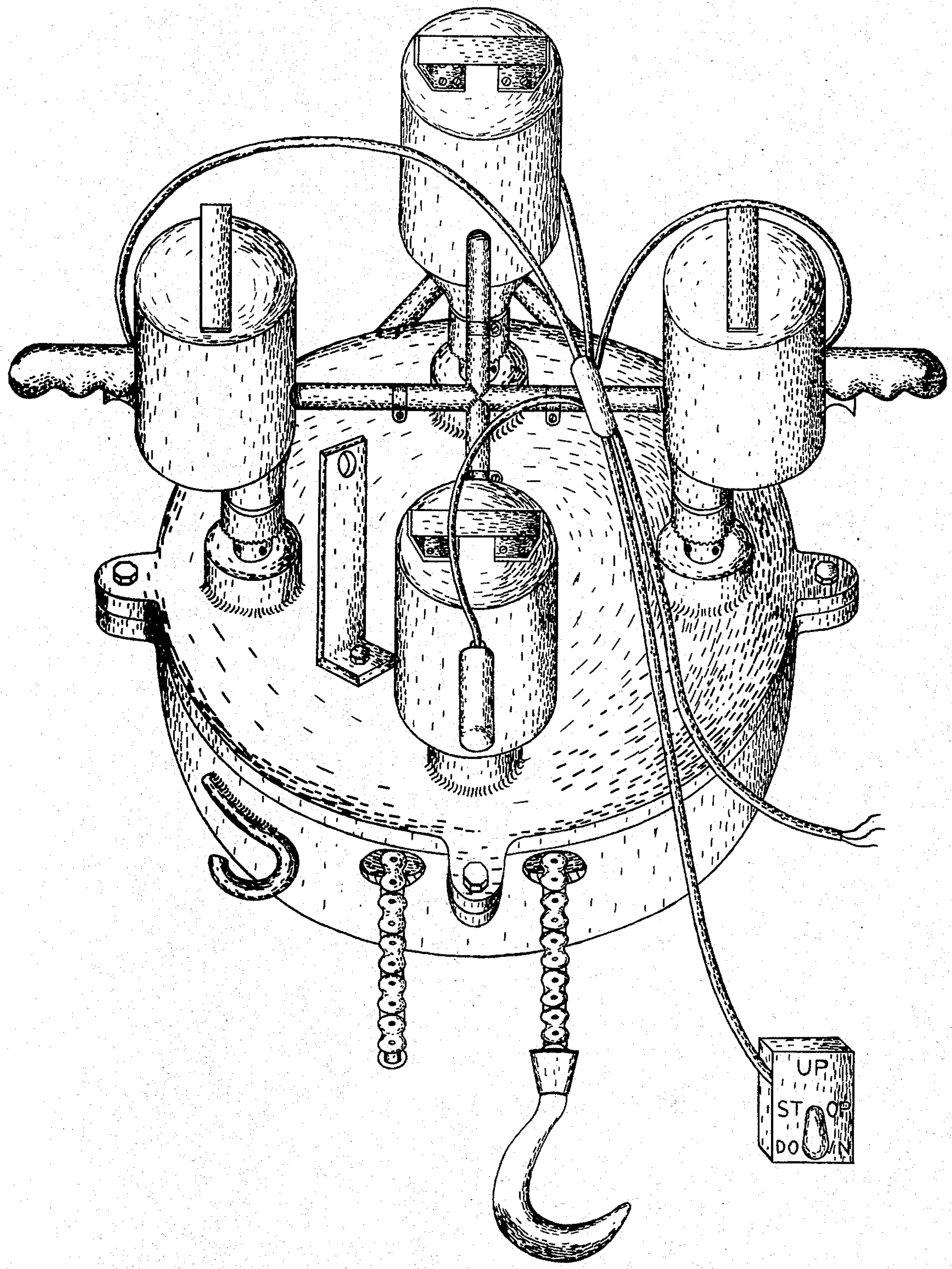
FIG. 10 is a perspective, pictorial drawing of the electric hoist utilizing four electric drills.

Referring now in more detail and by reference to characters of the drawings, which illustrate a preferred embodiment of the present invention, Item 1 of FIG. 1 is the main shell. This, in addition to being the main hoist body, also, in conjunction with the cover plate 25 of FIG. 4, becomes the gear case for ring gear 10 of FIG. 2 and drive pinions 13, 14, 15 and 16 of FIG. 3. This main body 1 of FIG. 1 has hoist attaching loop 2 welded on as shown. In assembly, bearing 3 of FIG. 1 accepts the gear end of shaft 11 FIGS. 2 and 6. Circlips 21, 22, 23 and 24 of FIG. 3 are installed in a small groove in shafts 17, 18, 19 and 20 and keep pinions 13, 14, 15 and 16 in mesh with gear 10 of FIGS. 2 and 6 as they come in contact with the inside of cover plate 25. Pinion shafts 17, 18, 19 and 20 of FIG. 3 are inserted in bearings 27, 28, 29 and 30 of FIG. 4 while pinions 13, 14, 15 and 16 of FIG. 3 are simultaneously fitted in ring gear 10 of FIG. 2 and as the sprocket end of shaft 11 of FIGS. 2 and 6 is also simultaneously fitted into bearing 26 of cover plate 25 of FIG. 4. Holes 6, 7, 8 and 9 of main shell 1 accept standard alloy steel bolts which also pass through holes 31, 32, 33 and 34 of cover plate 25 of FIG. 4 making one solid unit of 1, FIGS. 1 and 25, FIG. 4. Before the main body 1 and cover plate 25 are tightly joined, chain 35 of FIG. 5 is inserted in hole 4 of FIG. 1, passed over sprocket 12 of FIGS. 2 and 6 and then passed out through hole 5 of FIG. 1. Bracket 40 of FIG. 9 may be bolted to cover plate 25 of FIG. 4 at 51 but is not utilized unless the hoist is used with only one drill in which case the pipe handle of the drill is inserted through hole 49. One or more electric drills are then chucked to shafts 17, 18, and 19 and 20 of FIG. 3 which protrude beyond bearings 27, 28, 29 and 30 of FIG. 4 by about 1¼ inch. Pipe cross 44 of FIG. 8 is then fitted between the pipe handles of each drill and secured with hose clamps 45, 46, 47 and 48 of FIG. 8 as shown in FIG. 10. The entire hoist with the electric drills now becomes one solid unit. In the trigger switch of each electric drill all circuits are made "live" by the simple means of bypassing the switch and making wire contact at the screw attachment on the switch for each incoming wire of a three wire cable. The drill trigger switch is thereby functionally removed from the drill. The three wire cable from each drill is joined at junction box 41 as shown in FIG. 7. This junction box has standard quick disconnects for the incoming power cable, the switch cable and each drill cable. The switch 42 of FIG. 7 and shown in FIG. 10 is a conventional three way switch. Due to the wide speed ratio between the drill armature and shaft 11, approximately 200 to 1, it is not essential to utilize an armature brake to hold the load when the switch is in "STOP" position although a drill with an armature brake can be used if desired. FIG. 10 shows a hook welded to the side of main body 1 of FIG. 1 to accept hook 36 of FIG. 5 if it becomes desirable to double the weight lifting capacity of the hoist by utilizing a conventional block and tackle principle. In this event the sheave of the lifting hook block would be a free turning roller chain sprocket. When fully assembled mechanical advantage is obtained from the small pinions 13, 14, 15 and 16 of FIG. 3 turning the much larger ring gear 10 of FIGS. 2 and 6 the latter being integral with shaft 11 of FIGS. 2 and 6 which, in turn, turns a much smaller sprocket 12 of FIGS. 2 and 6. This sprocket 12 applies direct force to lifting chain 35 of FIG. 5 with which it is in mesh.

Minor changes and modifications in the form, construction, arrangement and combination of the several parts of the Electric Drill Powered Hoist may be made and substituted for those herein shown and described without departing from the nature and principle of my invention.

Having thus described my invention, what I claim and desire to secure by Letters Patent is:

1. In combination with (1) through (51) one or more protruding shafts (17), (18). (19) and (20) supporting reversing electric drills attached by means of geared chucks, with such drills being prevented from turning by a drill-connecting cross (44) or case mounted fixture (50) and with any and all electric drills receiving the same electric impulse command from one switch; a method of achieving lifting force.

2. A device according to claim 1 whereon the protruding shafts (17), (18), (19) and (20) have small, flat areas milled on one side to provide seating for set screws of hand cranks with such hand cranks providing a means of applying lifting torque to the protruding shafts where electrical power is not available.

* * * * *